No. 857,376. PATENTED JUNE 18, 1907.
J. AXELSTROM.
WINDMILL.
APPLICATION FILED APR. 20, 1906.
2 SHEETS—SHEET 2.
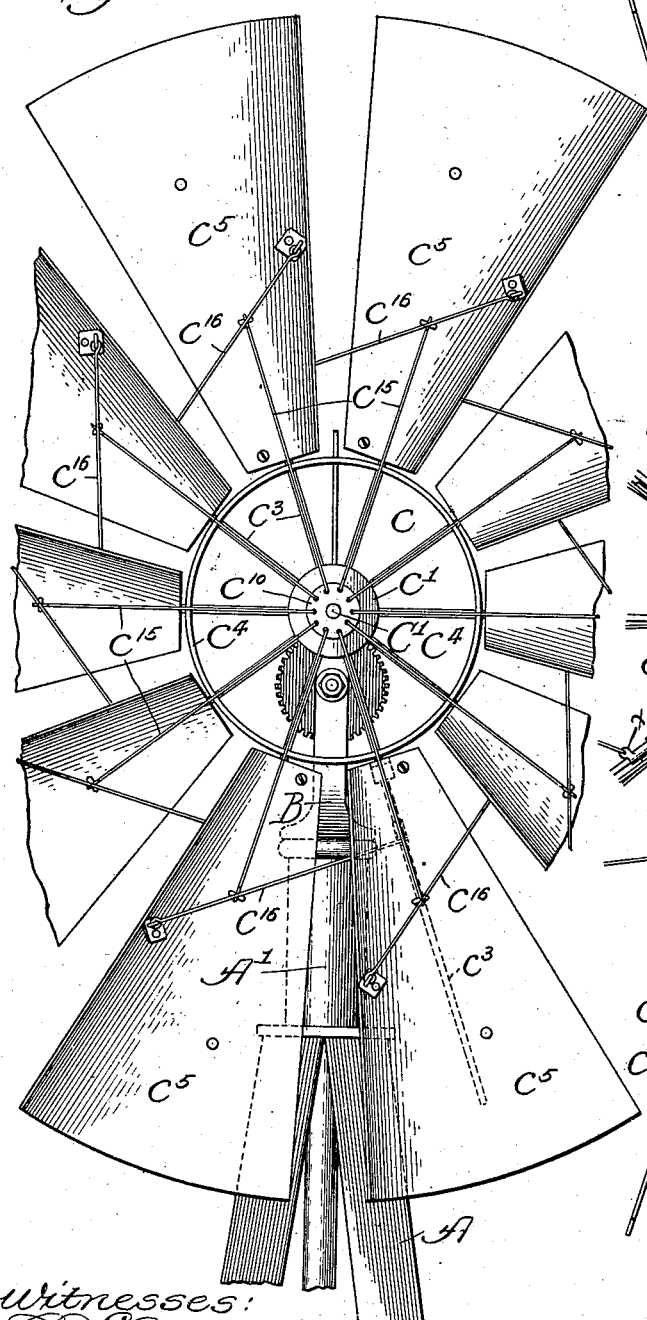
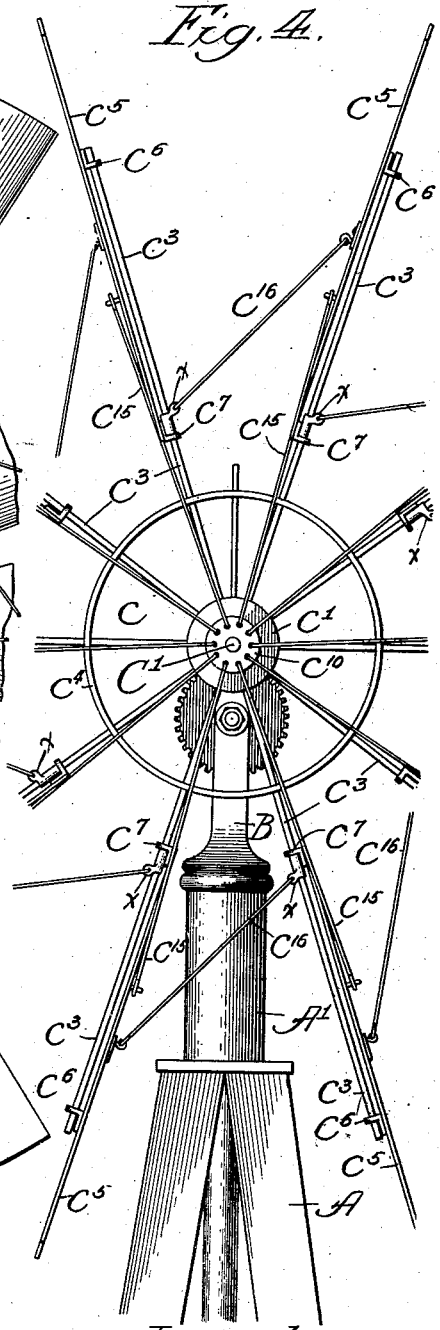

UNITED STATES PATENT OFFICE.

JOHN AXELSTROM, OF CHICAGO, ILLINOIS.

WINDMILL.

No. 857,376.

Specification of Letters Patent.

Patented June 18, 1907.

Application filed April 20, 1906. Serial No. 312,846.

*To all whom it may concern:*

Be it known that I, JOHN AXELSTROM, a citizen of the United States, residing at Chicago, in the county of Cook and State of Illinois, have invented a new and useful Improvement in Windmills, of which the following is a specification.

My invention relates particularly to automatically controlled wind-mills; and my primary object is to provide a practical construction of wind-mill having provision for self regulation of the speed of the wheel.

The invention is illustrated in the accompanying drawings, in which—

Figure 1:
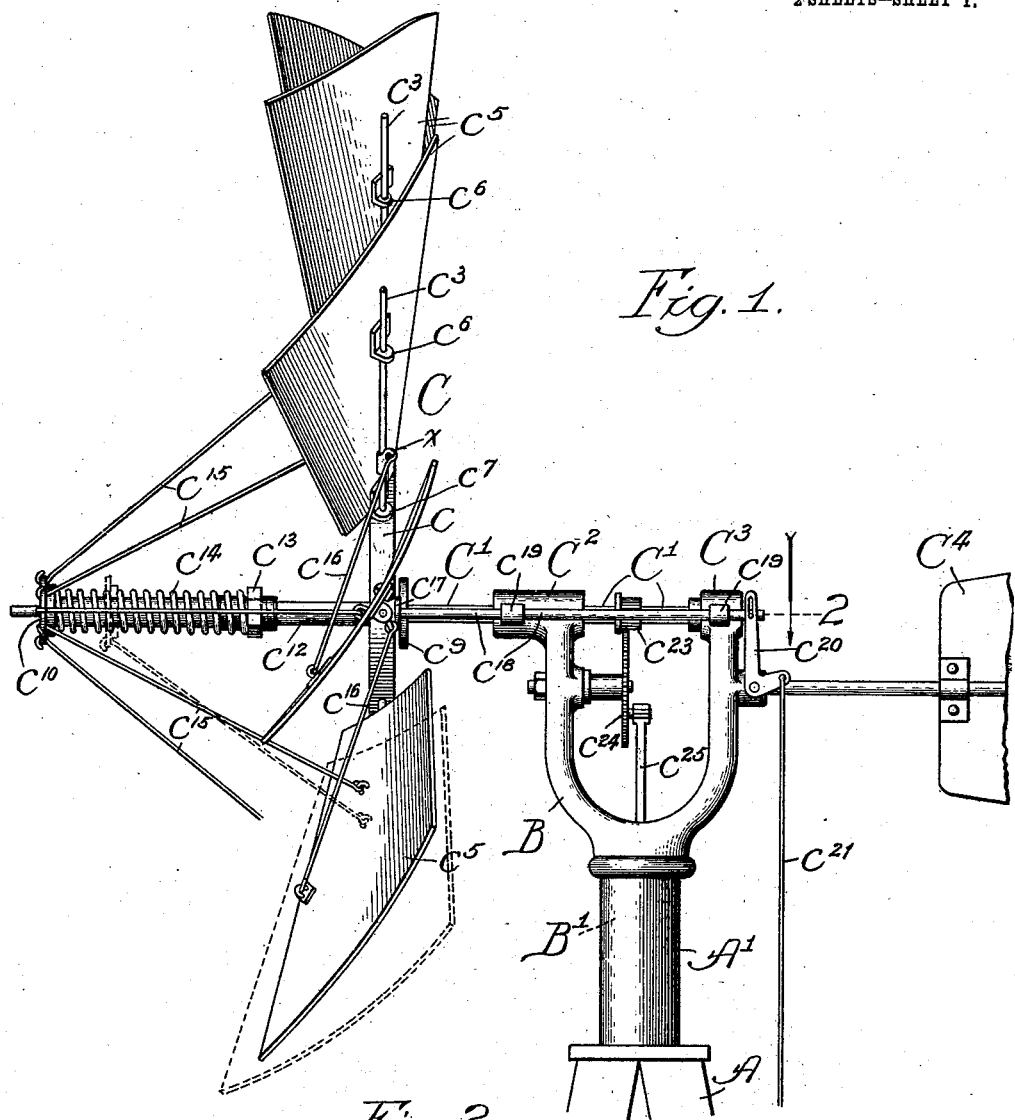
Figure 2:
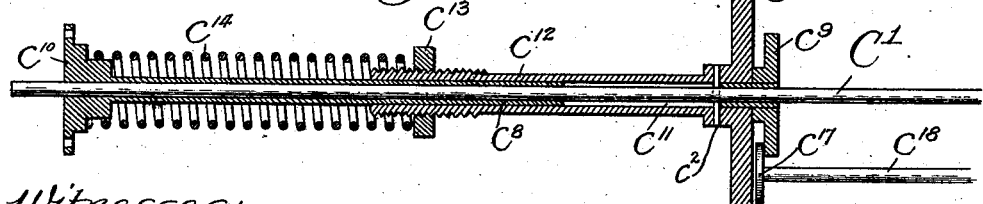

Figure 1 represents a broken elevational view of a wind-mill constructed in accordance with my invention; Fig. 2, a sectional detail view of the shaft of the wheel; Fig. 3, a broken elevational view of the wind-mill, looking at the wheel from the side opposite the vane or fan; and Fig. 4, a similar view, illustrating the position of the wheel-vanes, or blades, after they have been automatically moved to turn their edges to the wind, owing to the rapid rotation of the wheel.

In the construction shown, A represents a portion of the tower, which is equipped with a bearing $A^1$; B, a frame equipped with a swivel-portion $B^1$ journaled in the bearing $A^1$; C, a wheel mounted on a shaft $C^1$ which has one end journaled in bearings $C^2$, $C^3$ with which the frame B is provided; and $C^4$, a fan, or vane, rigidly connected with the frame B, and whose function is to keep the wheel presented sidewise to the wind.

The tower A, the frame B, and the swivel connection between the tower and member B may be of any suitable construction. The wheel comprises a spider $c$ having a hub $c^1$ rigidly connected by a pin $c^2$ to the shaft $C^1$; radial rods, or spokes, $c^3$ whose inner ends form a portion of the spider and whose outer ends project beyond the rim $c^4$ of the spider; vanes, or blades, $c^5$ equipped on their rear sides with clips $c^6$, $c^7$ slidably connected with the spokes $c^3$; a slidable tube $c^8$ through which the shaft $C^1$ extends and which extends through a central opening in the hub of the spider $c$, said tube being equipped at one end with a disk $c^9$ and at the other end with a disk $c^{10}$, the sleeve being also provided with a slot $c^{11}$ to permit movement with relation to the pin $c^2$ connecting the hub of the wheel with the shaft $C^1$; a tubular member $c^{12}$ having one end bearing against the hub of the wheel and the other end equipped with an adjustable nut $c^{13}$; a coil-spring $c^{14}$ confined between the nut $c^{13}$ and the disk $c^{10}$; rods $c^{15}$ connecting the disk $c^{10}$ with the front sides of the vanes near the spokes upon which said vanes are slidable and partially rotatable; and rods $c^{16}$ connecting the advance edges of the wheel-vanes, or blades, with rigid clips $x$ on the spokes $c^3$. The spider $c$, hub $c^1$ and spokes $c^3$ constitute a wheel-center upon which the vanes are movably mounted.

It will be observed that the rods $c^{15}$ incline from the points of connection with the disk $c^{10}$ to the points of connection with the wheel-blades; and the rods $c^{16}$ incline outwardly and also laterally from their points of connection with the spokes $c^3$ to their points of connection with the wheel-blades. It will be evident, therefore, that as the speed of rotation of the wheel increases and centrifugal force acts to throw the blades of the wheel outwardly radially, overcoming the resistance of the spring $c^{14}$, the blades will be turned upon their longitudinal axes to assume the position shown in Fig. 4. One of the blades is shown in dotted lines in Fig. 1 in an intermediate position, illustrating the manner of rotation and the swinging of the links or rods which are connected with the blades or vanes of the wheel. In the normal position of the parts with the wheel at rest, the disk $c^9$ bears against a disk $c^{17}$ confined between the disk $c^9$ and the hub of the wheel. The disk $c^{17}$ is secured on the end of a rod $c^{18}$ which extends parallel with the shaft $C^1$ and is slidable in bearings $c^{19}$ with which the frame member B is provided. The other end of the rod $c^{18}$ is connected with a bell-crank lever $c^{20}$ which may be operated by a depending rod $c^{21}$ which may extend to a convenient point near the ground. By this means, the rod $c^{18}$ may be shifted longitudinally to retract the sleeve $c^8$ against the force of the spring $c^{14}$ and turn the vanes of the wheel to the inoperative position.

The shaft $C^1$ is equipped with a pinion $c^{23}$ which operates a gear $c^{24}$ joined in the usual manner to a piston-rod $c^{25}$ of the pump. As stated, the tail-vane, or fan, $C^4$ is rigidly connected with the swiveled head, or frame, B and serves to present one side of the wheel to the wind.

The operation may be summarized briefly: When the wind operates to turn the wheel rapidly, the centrifugal force developed operates to move the wheel-vanes radially upon their longitudinal axes, the spring $c^{14}$ being compressed during this action, and the links $c^{16}$ operate to turn the vanes upon their axes, thereby presenting less surface to the wind. Thus, by adjusting the tension of the spring $c^{14}$, the rate of rotation of the wheel may be regulated for varying velocities of wind, according to climatic conditions. If desired, the sleeve $c^8$ may be shifted manually through the medium of the member $c^{21}$ and the rod $c^{18}$ to move the wheel-vanes to the inoperative position.

The foregoing detailed description has been given for clearness of understanding only, and no undue limitation is to be understood therefrom.

What I regard as new, and desire to secure by Letters Patent, is—

1. In a wind-mill, a wheel having rotatable, radially movable vanes, a compression spring projecting from one side of the wheel, connections between said spring and said vanes, and means for turning the vanes upon their axes as they move radially under the centrifugal force developed by the rotation of the wheel.

2. In a wind-mill, a wheel comprising a center with radial spokes, vanes having their longitudinal central portions pivotally and slidably connected with said spokes, a wheel-shaft, a spring encircling said shaft at one side of the wheel, a member connected with the outer end of said spring and linked to the wheel-vanes, and links connecting the wheel-vanes with the wheel-center, for the purpose set forth.

3. In a wind-mill, the combination of a wheel-shaft, a wheel mounted thereon having rotatable, radially movable vanes, a spring projecting laterally at one side of the wheel, a member connected with the outer end of said spring and extending through the wheel-hub, links connecting the outer end of said member with the wheel-vanes, means for rotating the wheel-vanes upon their axes, and means for shifting the member extending through the wheel to turn the vanes to the inoperative position.

4. In a wind-mill, the combination of a wheel-shaft, a wheel-center mounted thereon, rotatable, radially movable vanes connected with said wheel-center, a spring projecting laterally from one side of the wheel, a member connected with the outer end of said spring and linked to the wheel-vanes, means for rotating the wheel-vanes on their axes, and means for adjusting the tension of said spring.

JOHN AXELSTROM.

In presence of—
J. H. LANDES,
A. U. THORIEN.